(12) United States Patent
Bickford et al.

(10) Patent No.: US 7,523,496 B2
(45) Date of Patent: Apr. 21, 2009

(54) AUTHENTICATING WITHOUT OPENING ELECTRONIC MAIL

(75) Inventors: John Holden Bickford, Hyde Park, NY (US); Charles Steven Lingafelt, Durham, NC (US); Robert B. Sisk, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 1709 days.

(21) Appl. No.: 09/919,248

(22) Filed: Jul. 31, 2001

(65) Prior Publication Data

US 2003/0028767 A1 Feb. 6, 2003

(51) Int. Cl.
*G06F 11/30* (2006.01)
*G06F 12/14* (2006.01)
*G06F 15/16* (2006.01)

(52) U.S. Cl. .......................... 726/22; 713/169; 709/206
(58) Field of Classification Search ................. 713/169; 726/22; 709/206
See application file for complete search history.

(56) References Cited

U.S. PATENT DOCUMENTS

| | | | | |
|---|---|---|---|---|
| 5,937,160 A | * | 8/1999 | Davis et al. ................. | 709/203 |
| 6,405,244 B1 | * | 6/2002 | Bando et al. ................. | 709/206 |
| 6,505,300 B2 | * | 1/2003 | Chan et al. ................... | 713/164 |
| 6,697,942 B1 | * | 2/2004 | L'Heureux et al. .......... | 713/152 |
| 2002/0010638 A1 | * | 1/2002 | Fischer ........................ | 705/26 |
| 2002/0016824 A1 | * | 2/2002 | Leeds .......................... | 709/207 |
| 2002/0054365 A1 | * | 5/2002 | Eguchi ........................ | 358/405 |
| 2003/0009698 A1 | * | 1/2003 | Lindeman et al. ........... | 713/201 |

OTHER PUBLICATIONS

MSA, posted by Arthur Urbanowicz on Aug. 27, 1999, <http://www.zmailer.org/mhalist/1999/msg00606.html>, pp. 1-3.*
"memory: Definition, Synonyms and Much More from Answers.com," pp. 1-3.*
Crocker, David, "Standard for the Format of ARPA Internet Text Messages," Aug. 13, 1982, pp. 17-19.*

* cited by examiner

*Primary Examiner*—Emmanuel L Moise
*Assistant Examiner*—Michael Pyzocha
(74) *Attorney, Agent, or Firm*—Schmeiser, Olsen & Watts; David R. Irvin; John R. Pivnichny

(57) ABSTRACT

A method for enabling the recipient of electronic mail (e-mail) to authenticate the originator of the e-mail without opening the e-mail, so that e-mail that carries a computer virus which activates upon opening the e-mail may be rejected. The originator and the recipient agree beforehand on a privately held authentication code, which is carried in an open field of the e-mail, i.e., carried in a field that is visible to an agent of the recipient without opening the e-mail.

13 Claims, 2 Drawing Sheets

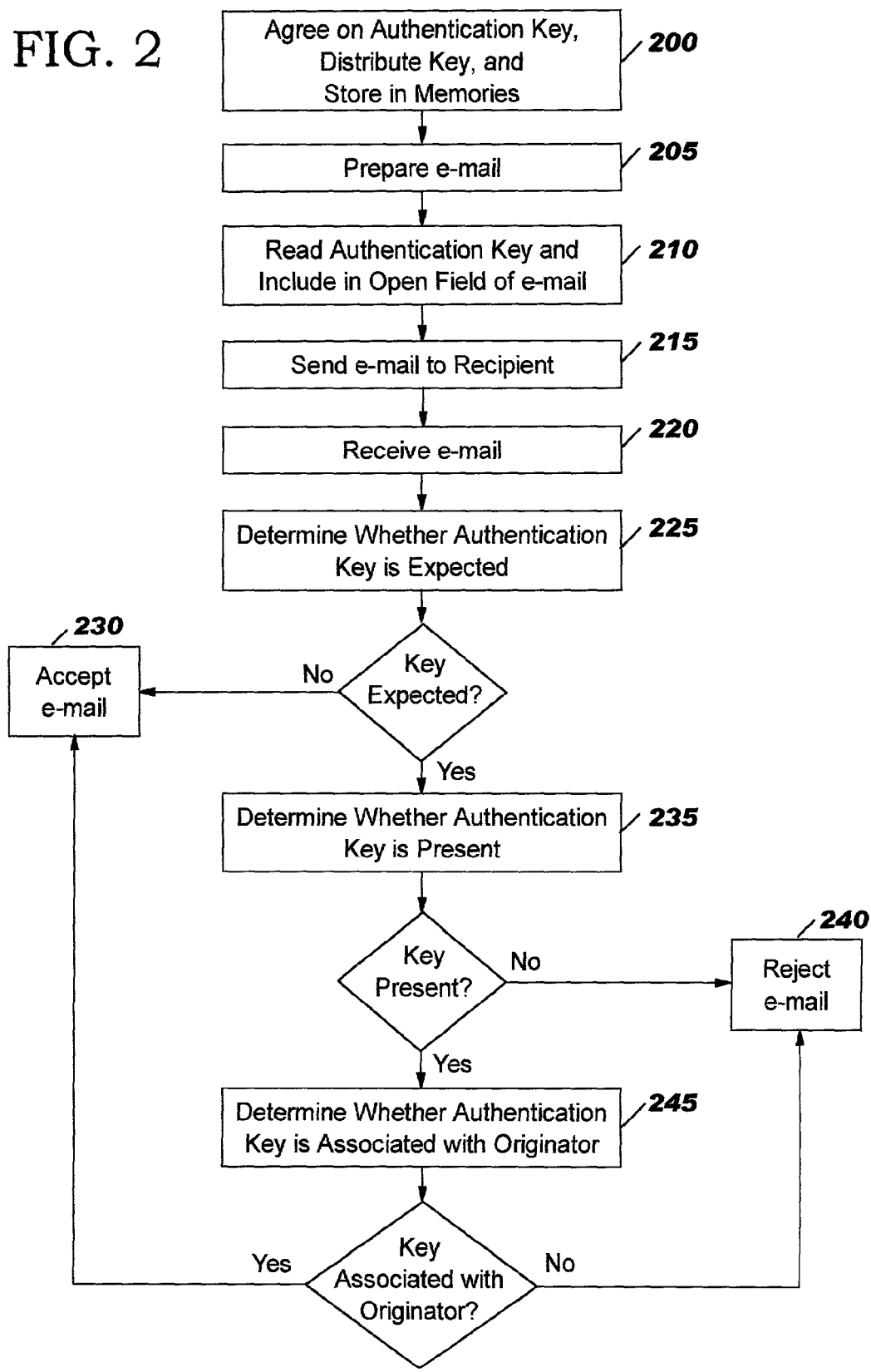

AUTHENTICATING WITHOUT OPENING ELECTRONIC MAIL

FIELD OF THE INVENTION

The present invention relates to the field of electronic mail, and more particularly to a method for authenticating electronic mail that does not require opening the electronic mail, so that mail which carries a computer virus may be identified and rejected prior to opening.

BACKGROUND

Computer viruses initiated by electronic vandals are now responsible for the loss of untold hours of labor. In many cases, these viruses are spread as attachments to electronic mail (e-mail). When a recipient opens e-mail initiated by a vandal, and then opens the attachment, the virus is unleashed to do its damage. For this reason, experienced computer users are sometimes reluctant to open e-mail attachments.

Consequently, electronic vandals often go to great lengths to give their e-mail a veneer of legitimacy, often by fraudulently stating the identity of its originator. For example, a virus may gain access to the address book of a first computer user, and propagate itself, under the assumed identity of the first computer user, to a number of recipients who have come to trust the integrity of e-mail received from the first computer user. Still, when the virus is carried by an attachment to e-mail, the recipient may open the e-mail and inspect the attachment outwardly without taking undue risk. Upon inspection, the odd nature of malevolent attachments, for example their use of odd file types, may alert the recipient to the true purpose of the e-mail, and the recipient may discard the e-mail without opening the attachment and therefore without sustaining any damage.

Unfortunately, vandals have now developed viruses that may be carried directly by e-mail, and do not require transport in an attachment. When a victim receives such an e-mail that fraudulently purports to originate from a trusted source, the victimized recipient may instinctively open the e-mail and thereby contract the virus. Thus, there is a need for a method of authenticating e-mail—verifying that the e-mail indeed originates from the source whose identity it bears, and may therefore be presumed virus-free—which does not require that the recipient open the e-mail.

SUMMARY

The present invention provides a way of authenticating electronic mail (e-mail) that does not require the recipient to open the e-mail, so that the recipient may guard against computer viruses that become active when electronic mail is opened.

An originator and a recipient agree beforehand on a privately held authentication key, such as a simple natural-language phrase, which identifies the originator to the recipient. The originator prepares e-mail addressed to the recipient. The originator reads the authentication key from a memory, for example a database. The authentication key is included in a field of the e-mail that can be examined by the recipient without opening the e-mail, which is called here an open field, and which may be, for example, the subject line of the e-mail. The e-mail is then sent from the originator to the recipient.

When the recipient receives the e-mail, the recipient identifies the originator by examining a source identifier of the e-mail, for example its from address. The recipient determines whether an authentication key is expected to be present in e-mail that bears the particular source identifier. If an authentication key is expected to be present but is in fact not present, the recipient may reject the e-mail. If an authentication key is present, the recipient determines whether the authentication key that is present is the earlier-agreed authentication key associated with the originator. If the authentication key present is the earlier-agreed authentication key, the recipient may open the e-mail. If the authentication key present is not the earlier-agreed authentication key, the recipient may reject the e-mail.

Thus, the present invention enables the recipient of e-mail to authenticate the purported originator of the e-mail without opening the e-mail, and consequently enables the recipient to reject e-mail that fraudulently bears the identifier of a trusted originator and yet carries a computer virus that would otherwise activate were the recipient to open the e-mail. These and other aspects of the invention will be more fully appreciated when considered in light of the following detailed description and drawings.

BRIEF DESCRIPTION OF THE DRAWINGS

FIG. 2 is a flowchart that shows aspects of the operation of an exemplary embodiment of the invention.

DETAILED DESCRIPTION

Figure 1:
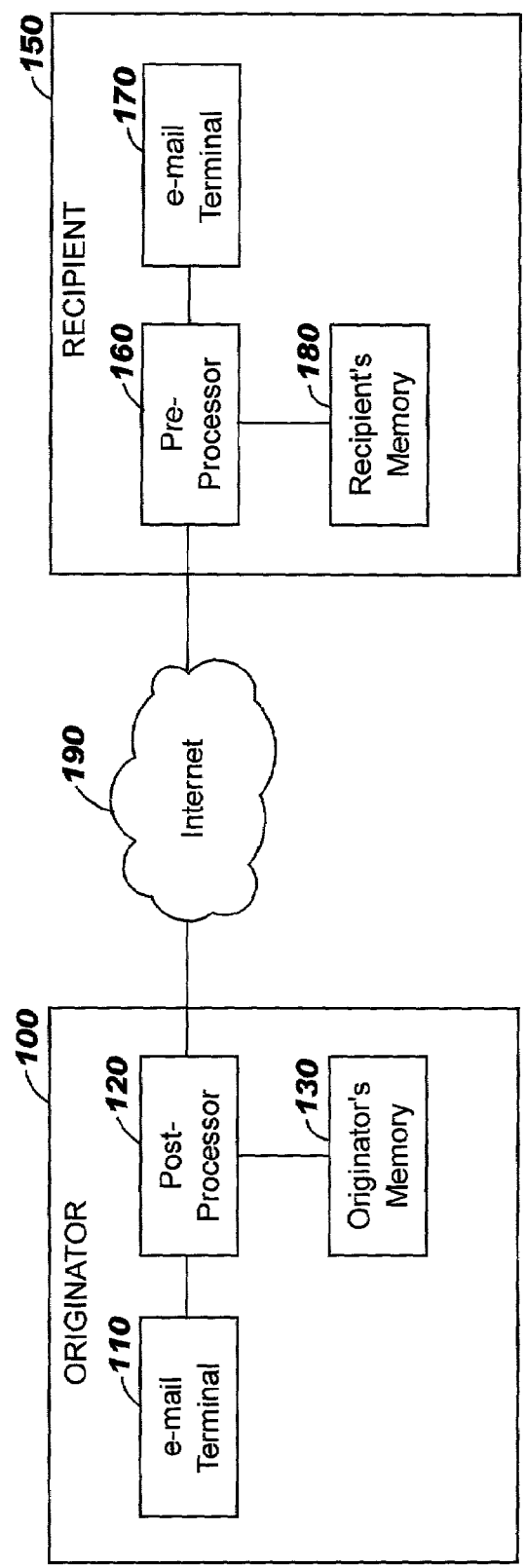
FIG. 1 is a block diagram that shows structural aspects of an exemplary embodiment of the invention.

The present invention enables a recipient of electronic mail (e-mail) to authenticate the purported originator of the e-mail without opening the e-mail, and consequently enables the recipient to reject e-mail that fraudulently bears the identifier of a trusted originator and yet carries a computer virus that would otherwise activate were the recipient to open the e-mail.

FIG. 1 is a block diagram that shows structural aspects of an exemplary embodiment of the invention. In the exemplary embodiment of FIG. 1, an originator 100 prepares e-mail for sending to a recipient 150. The originator 100 may include an e-mail terminal 110 suitable for use by a human, such as a personal computer, a personal digital assistant, limited-function apparatus for supporting e-mail, an e-mail-enabled cellular telephone, and the like. The originator 100 may include a post-processor 120 for executing certain aspects of the present invention as will be described. Although the post-processor 120 is shown in FIG. 1 for descriptive convenience as being separate from the e-mail terminal 110, the post-processor 120 may be integrated with the e-mail terminal 110. For example, the post-processor 120 may be software that is executed by the e-mail terminal 110. Also shown in FIG. 1 is an originator's memory 130, which may be a single register, a multi-register structure, a database, and so forth. Although the originator's memory 130 is shown in FIG. 1 for descriptive convenience as being separate from the e-mail terminal 110 and the post-processor 120, the originator's memory 130 may be internal to the e-mail terminal 110 or the post-processor 120.

The originator 110 is connected to the recipient 150 by the Internet 190 or other communication network, which other communication network may be local-area or wide-area in its coverage.

The recipient 150 may include an e-mail terminal 170 suitable for use by a human, such as a personal computer, a personal digital assistant, limited-function apparatus for supporting e-mail, an e-mail enabled cellular telephone, and the like. The recipient 150 may include a pre-processor 160 for executing certain aspects of the present invention as will be described. Although the pre-processor 160 is shown in FIG. 1 for descriptive convenience as being separate from the e-mail terminal 170, the pre-processor 160 may be integrated with the e-mail terminal 170. For example, the pre-processor 160 may be software that is executed by the e-mail terminal 170. Also shown in FIG. 1 is a recipient's memory 180, which may be a single register, a multi-register structure, a database, and so forth. Although the recipient's memory 180 is shown in FIG. 1 for descriptive convenience as being separate from the e-mail terminal 170 and the pre-processor 160, the recipient's memory 180 may be internal to the e-mail terminal 170 or the pre-processor 160.

FIG. 2 is a flowchart that shows aspects of the operation of an exemplary embodiment of the invention. Before the originator 100 prepares the e-mail, the originator 100 and the recipient 150 agree on an authentication key that identifies the originator 100 to the recipient 150 (step 200). The authentication key may be a natural-language word or a natural-language phrase, although this is not a limitation of the invention, as the authentication key may be any set of alphanumeric or other characters. For example, an authentication key might be the word "asparagus," or the phrase "the truth shall make you free," or the character string "xx6$jdf," and so forth. The authentication key may be dependent upon only the identity of the originator 100, or may depend on the identity of both the originator 100 and the recipient 150. In an example of the former kind of dependence, an originator might use the authentication key "ABC" when preparing e-mail for any recipient, whereas, in an example of the latter kind of dependence, another originator might use the authentication key "DEF" when preparing e-mail for a first recipient, and use the authentication key "GHI" when preparing e-mail for a second recipient. In the former case, the authentication key is associated with only the originator 100; in the latter case, the authentication key associated with the originator 100 is further associated with the recipient 150.

The authentication key may be provided a priori to the originator 100 and the recipient 150. The originator 100 may store the authentication key in the originator's memory 130, and the recipient may store, in the recipient's memory 180, the authentication key along with an indicator, such as a flag, which indicates whether e-mail from the originator 100 is expected to include an authentication key. Optionally, the authentication key may be stored encrypted in either memory or in both.

The e-mail terminal 110 of the originator 100 prepares e-mail for sending from the originator 100 to the recipient 150 (step 205). The post-processor 120 accepts the e-mail from the e-mail terminal 110, reads the authentication key from the originator's memory 130, and includes the authentication key in an open field of the e-mail (step 210). Optionally, inclusion of the authentication key may be responsive to an automatic prompt by the post-processor 120 through the e-mail terminal 110, followed by manual authorization by a human using the e-mail terminal 110. The address of the location from which the authentication key is read in the originator's memory 130 may be dependent upon an identifier of the recipient 150, for example arithmetically dependent upon the to-address of the e-mail. The open field of the e-mail may be any field that the recipient 150 can access without opening the e-mail, for example the subject line of the e-mail, and may be visible to a human viewing the recipient's e-mail terminal 170 or may be hidden from view.

The e-mail with authentication key is sent from the originator 100 to the recipient 150 (step 215), and the recipient 150 receives the e-mail (step 220).

Upon receipt of the e-mail by the recipient 150, the pre-processor 160 determines whether an authentication key should be expected to be present in the open field of the incoming e-mail (step 225). To make this determination, the pre-processor 160 may access the recipient's memory 180, looking for the indicator which indicates whether e-mail from the originator 100 is expected to include an authentication key. If an authentication key is not expected to be present in the open field, the pre-processor 160 may accept the e-mail (step 230). To accept the e-mail and to reject the e-mail are complements here—e-mail that is accepted by the pre-processor 160 is simply e-mail that is not rejected by the pre-processor 160, and acceptance by the pre-processor 160 carries no implication that the e-mail will necessarily be opened.

Otherwise (i.e., an authentication key is expected to be present in the open field), the preprocessor 160 examines the open field and determines whether an authentication key is present (step 235). If an authentication key is not present in the open field, the pre-processor may reject the e-mail (step 240). E-mail that is rejected may be discarded automatically, or may be retained but marked as suspicious so that a human may decide whether to open or to discard the e-mail.

Otherwise (i.e., an authentication key is present in the open field), the pre-processor 160 determines whether the authentication key present in the open field is associated with the originator 100 (step 245), i.e., the authentication key present is the same as the agreed authentication key which was earlier stored in the originator's memory 130 and the recipient's memory 180. To make this determination, the pre-processor 160 may access the recipient's memory 180 at a location dependent upon an indicator that identifies the originator 150, such as the e-mail's from-address, read the authentication key stored earlier, and compare the authentication key present with the authentication key stored earlier.

If the authentication key present in the open field is associated with the originator, i.e., the authentication key present is the same as the authentication key stored earlier, the pre-processor 160 accepts the e-mail (step 230). Otherwise (i.e., the authentication key present in the open field is not associated with the originator), the pre-processor 160 rejects the e-mail.

In another embodiment of the invention, which may not require the use of the post-processor 120 or the pre-processor 160, the authentication key may be recalled by a first human who uses the e-mail terminal 110 to manually enter the authentication key in an open field of the e-mail, for example on the subject line of the e-mail. Upon receipt of the e-mail by a second human, the second human may determine whether the authentication key associated with the originator appears in the open field, and decide accordingly whether to open the e-mail or not.

From the foregoing description, those skilled in the art will appreciate that the present invention provides an authentication method that enables a computer user to guard against a computer virus that is carried in e-mail with a fraudulent identifier such as a fraudulent from-address and which becomes active upon opening the e-mail. The foregoing description is illustrative rather than limiting, however, and the scope of the present invention is limited only by the following claims.

We claim:

1. An authentication method for electronic mail, comprising the steps of:

storing an authentication key in a memory of a recipient of the electronic mail at an address that is dependent upon a source identifier that identifies an originator of the electronic mail;

receiving, by the recipient, the electronic mail from the originator;

responsive to receiving the electronic mail, determining whether the authentication key is present in an open field of the electronic mail;

responsive to determining that the authentication key is present, determining whether the authentication key is associated with the originator; and responsive to determining that the authentication key is not associated with the originator, rejecting the electronic mail, wherein said determining whether the authentication key is associated with the originator includes: reading the stored authentication key from the address at the memory of the recipient, and comparing the authentication key with the stored authentication key that had been read from the address at the memory of the recipient to determine whether the authentication key is associated with the originator.

2. The method of claim 1, wherein the open field is a subject line of the electronic mail.

3. The method of claim 1, wherein the authentication key is dependent upon only an identity of the originator.

4. An authentication method for electronic mail, comprising the steps of:

receiving, by a recipient, electronic mail from an originator;

responsive to receiving the electronic mail, determining whether an authentication key is expected to be present in an open field of the electronic mail;

responsive to determining that the authentication key is expected to be present, determining whether the authentication key is present; and responsive to determining that the authentication key is not expected to be present, accepting the electronic mail.

5. The method of claim 4, wherein the authentication key is dependent upon only an identity of the originator.

6. An authentication method for electronic mail, comprising the steps of:

receiving, by a recipient, electronic mail from an originator;

responsive to receiving the electronic mail, determining whether an authentication key is expected to be present in an open field of the electronic mail;

responsive to determining that the authentication key is expected to be present, determining whether the authentication key is present;

responsive to determining that the authentication key is not present, rejecting the electronic mail;

responsive to determining that the authentication key is present, determining whether the authentication key is associated with the originator;

responsive to determining that the authentication key is associated with the originator, accepting the electronic mail; and responsive to determining that the authentication key is not associated with the originator, rejecting the electronic mail.

7. The method of claim 6, wherein the step of determining whether an authentication key is expected to be present in an open field of the electronic mail includes the steps of:

reading a flag from a memory of the recipient at an address that is dependent upon a source identifier that identifies the originator, wherein the flag indicates whether the electronic mail from the originator is expected to include the authentication key; and determining from the flag that had been read from the memory whether the authentication key is expected to be present in the open field of the electronic mail.

8. The method of claim 6, wherein the method further comprises storing the authentication key in a memory of the recipient at an address that is dependent upon a source identifier that identifies the originator, wherein the step of determining whether the authentication key is associated with the originator includes the steps of:

reading the stored authentication key from the address at the memory of the recipient; and comparing the authentication key with the stored authentication key that had been read from the address at the memory of the recipient to determine whether the authentication key is associated with the originator.

9. The method of claim 8, wherein the authentication key is dependent upon only an identity of the originator.

10. The method of claim 6, wherein the authentication key is dependent upon only an identity of the originator.

11. An authentication method for electronic mail, comprising the steps of:

receiving, by a recipient, the electronic mail from an originator, the electronic mail having been previously prepared for sending from the originator to the recipient;

responsive to receiving the electronic mail, determining whether an authentication key is expected to be present in an open field of the electronic mail;

responsive to determining that the authentication key is expected to be present, determining whether the authentication key is present; and responsive to determining that the authentication key is not present in the open field of the electronic mail, rejecting the electronic mail.

12. The method of claim 11, wherein the authentication key is dependent upon only an identity of the originator.

13. An authentication method for electronic mail having a subject line, comprising the steps of:

receiving, by a recipient, the electronic mail from an originator, the electronic mail having been previously prepared for sending from the originator with a source identifier to the recipient with a destination identifier;

responsive to receiving the electronic mail, determining whether an authentication key is expected to be present in an open field of the electronic mail;

responsive to determining that the authentication key is not expected to be present, accepting the electronic mail;

responsive to determining that the authentication key is expected to be present, determining whether the authentication key is present;

responsive to determining that the authentication key is present, determining whether the authentication key is associated with both the originator and the recipient;

responsive to determining that the authentication key is associated with both the originator and the recipient, accepting the electronic mail;

responsive to determining that the authentication key is not associated with both the originator and the recipient, rejecting the electronic mail; and responsive to determining that the authentication key is not present, rejecting the electronic mail.

* * * * *